United States Patent [19]

Nishikawa et al.

[11] 4,390,691

[45] Jun. 28, 1983

[54] PROCESS FOR PREPARING POROUS SPHERICAL CELLULOSE PARTICLES

[75] Inventors: Masahiko Nishikawa; Hiroaki Ishibashi; Hidenori Furukawa, all of Minamatashi, Japan

[73] Assignee: Chisso Corporation, Osaka, Japan

[21] Appl. No.: 285,582

[22] Filed: Jul. 21, 1981

[30] Foreign Application Priority Data

Aug. 21, 1980 [JP] Japan .................. 55-114982

[51] Int. Cl.³ .................. C08B 3/06; C08B 3/08; C08B 3/16; C08B 3/18
[52] U.S. Cl. .................. 536/65; 536/68; 536/76; 536/79; 536/80; 536/81; 536/82
[58] Field of Search .................. 536/65, 68, 76, 79, 536/80, 81, 82; 106/190, 196

[56] References Cited

U.S. PATENT DOCUMENTS

| | | | |
|---|---|---|---|
| 2,872,331 | 2/1959 | Grady et al. | 106/196 |
| 3,444,286 | 5/1969 | King et al. | 264/49 |
| 3,557,083 | 1/1971 | Sacco | 106/196 |
| 3,560,232 | 2/1971 | Littman | 106/196 |
| 4,239,545 | 12/1980 | Uemura et al. | 106/196 |
| 4,312,980 | 1/1982 | Motozato et al. | 536/82 |

FOREIGN PATENT DOCUMENTS

25639 3/1981 European Pat. Off. .

*Primary Examiner*—Ronald W. Griffin
*Attorney, Agent, or Firm*—Fred Philpitt

[57] ABSTRACT

A process for preparing porous, spherical cellulose particles which comprises suspending a cellulose organic ester solution dissolved in a chlorinated hydrocarbon solvent into an aqueous medium to form droplets of the solution, evaporating the chlorinated hydrocarbon solvent in the droplets to form cellulose organic ester spherical particles, and saponifying the cellulose organic ester spherical particles. In the aforesaid process, an acid or alkali is added and mixed with the cellulose organic ester solution prior to suspending the cellulose organic ester solution into the aqueous medium to control the porosity of the porous, spherical cellulose particles with high reproducibility.

15 Claims, 5 Drawing Figures

PROCESS FOR PREPARING POROUS SPHERICAL CELLULOSE PARTICLES

BACKGROUND OF THE INVENTION (1) Field of the Invention

This invention relates to a process for preparing porous, spherical cellulose particles.

(2) Description of the Prior Art

Various methods of separating and purifying substances have been developed with the progress in the field of biochemistry. The currently used methods as above include ion-exchange chromatography, gel filtration, affinity chromatography, and the like. Known materials used in the aforesaid methods include dextran, agarose, polyacrylamide, cellulose, and the like. Many attempts have been made by use of the aforesaid materials so that their properties as a gel filtering material or ion exchanger may be fully exhibited. A preferable form as the gel filtering material is a sphere from the standpoints of separation property, flow rate and the like.

Few practical applications of cellulose to the gel filtering material are known at present, but attempts on the preparation of spherical cellulose particles have been made so far. For example, a process for preparing cellulose particles from a viscose, or a cuprammonium solution, in which cellulose is dissolved, is disclosed in Japanese patent laid-open specification Nos. 60753/1973, 60754/1973, and 5361/1976, and Japanese patent published specification No. 11237/1977. On the other hand, Japanese patent laid-open specification No. 7759/1978 discloses a process for preparing spherical cellulose particles from cellulose acetate.

The process according to Japanese patent laid-open specification No. 7759/1978 is so improved as to make it possible to obtain real spherical cellulose particles having excellent properties as the gel filtering material. The aforesaid process is such that a cellulose triacetate solution dissolved in a chlorinated hydrocarbon solvent or in a mixed solvent consisting mainly thereof as a stock solution is added dropwise into an aqueous medium with stirring to form suspended particles, and that the aqueous medium containing the suspended particles is heated to evaporate the solvent and subsequently to form cellulose organic ester spherical particles followed by saponification thereof. The gel filtering material is often used for the so-called desalting, in which a polymeric substance such as protein is separated from a salt such as sodium chloride, urea, ammonium sulfate, or the like. The desalting has been applied on an industrial scale, in which desirable properties as the gel filtering material require that many samples can be separated fast with high purity. In order to satisfy the aforesaid properties, some difference is needed between an elution volume of protein and that of salt. In case that such a gel that has a small difference between elution volume of protein and that of salt is used for the treatment of much quantity of sample, the separation ability of the gel is insufficient and it causes poor purity of eluates, consequently, the gel is hard to be used for industrial scale.

SUMMARY OF THE INVENTION

An object of this invention is to provide an improved process for preparing porous, spherical cellulose particles usable as a gel filtering material excellent in separation property due to a sufficient difference between an elution volume of protein and that of salt by overcoming the aforesaid problems in the process disclosed in Japanese patent laid-open specification No. 7759/1978.

This invention provides a process for preparing porous, spherical cellulose particles in which a cellulose organic ester solution dissolved in a solvent mainly consisting of a chlorinated hydrocarbon is suspended into an aqueous medium to form droplets of the solution, the solvent in the droplets are evaporated to form cellulose organic ester particles, and the cellulose organic ester particles are saponified, an acid or alkali being added and mixed with the cellulose organic ester solution prior to suspending the cellulose organic ester solution into the aqueous medium.

BRIEF DESCRIPTION OF THE DRAWINGS

In FIGS. 2 to 5, $OD_{280}$ represents ultraviolet absorption spectrum (absorbance) at 280 nm.

DETAILED DESCRIPTION OF THE INVENTION AND THE PREFERRED EMBODIMENTS

Figure 1:
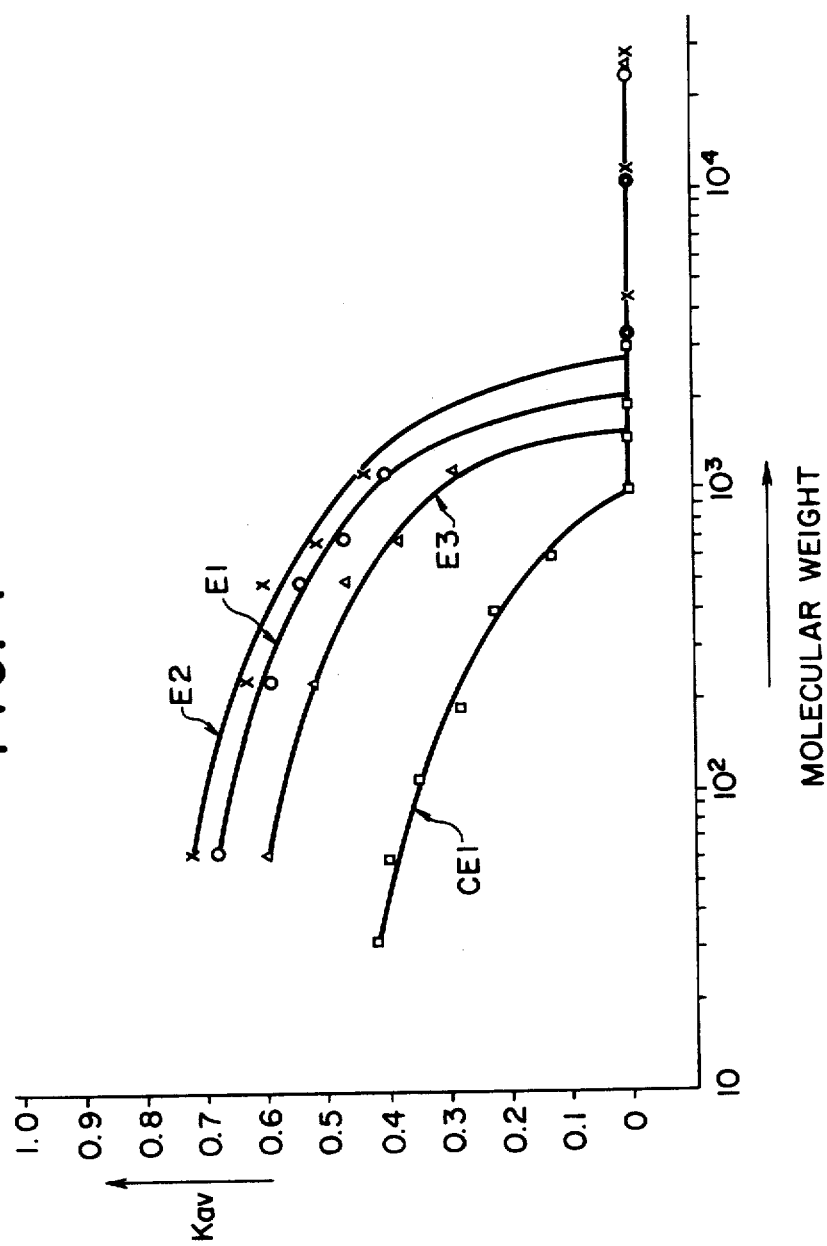
FIG. 1 is a graph of Kav values of spherical cellulose particles obtained by the process of the present invention ($E_1$, $E_2$ and $E_3$), and by the process of the prior art (CE1) against molecular weight of polyethylene glycol used.

There are no special limitations to cellulose organic ester used in the present invention, and examples thereof may include those obtained by acylation of linter, wood pulp, crystalline cellulose, etc. such as cellulose acetate normally having an acetylation degree of from 45 to 62.5%, cellulose acetate butylate normally having an acylation degree of from 50 to 70%, cellulose butylate normally having a butylation degree of from 50 to 70.5%, and cellulose acetate propionate normally having an acylation degree of from 48 to 65%.

The solvent usable in the present invention for cellulose organic ester may be selected from those capable of dissolving uniformly the cellulose organic ester, and examples thereof include chlorinated hydrocarbon solvents such as dichloromethane, chloroform, carbon tetrachloride, tetrachloroethane, trichloroethane, trichloroethylene, tetrachloroethylene, and mixtures thereof, and mixed solvents of the aforesaid chlorinated hydrocarbon solvents as the major component with other organic solvents such as methanol, ethanol, acetone, and nitromethane.

In the process of the present invention, the acid or alkali may be added to a solution prepared by dissolving cellulose organic ester in the aforesaid solvent, or to the solvent while cellulose organic ester being dissolved or prior to dissolution, preferably to the solution prepared by dissolving cellulose organic ester from the standpoints of reproducibility, and the like.

Examples of acid usable in the present invention include hydrochloric acid, hydrobromic acid, hydrofluoric acid, sulfuric acid, nitric acid, phosphoric acid, sulfurous acid, and sulfonic acid such as p-toluene sulfonic acid, preferably inorganic acid.

Examples of alkali usable in the present invention include the hydroxides and alcoholates of alkali metals or alkaline earth metals.

The aforesaid acid or alkali may be used in the form of a solution dissolved in water, an organic solvent, or a mixed solvent thereof, or in the form of a nonsolvent. The addition amount of the acid or alkali at its pure state is in the range of from 0.001 to 20% by weight, preferably 0.01 to 15% by weight, more preferably 0.05 to 10% by weight based on cellulose organic ester.

The concentration of cellulose organic ester in the cellulose organic ester solution of the present invention may be selected from the range of solubility of cellulose organic ester in the solvent, and is preferably in the range of from 1 to 15 parts by weight based on 100 parts by volume of the solvent, where the relationship between volume and weight is of 1 to kg, or ml to g.

In a preferred process of the present invention, acid or alkali is added to the cellulose organic ester solution and then mixed with agitation at a temperature of from 0° to 45° C., preferably 15° to 40° C. for a period of time of from 0.2 to 30 hours, preferably 0.5 to 20 hours, and the resulting solution is added to an aqueous medium.

The aqueous medium preferably contains a dispersant such as polyvinyl alcohol, gelatin, CMC, or the like, or a surfactant of an anionic, cationic, nonionic, ampholytic, or polymer type, or a mixture thereof in order to maintain the dispersion and shape of droplets therein, and so forth. The amount to be added of the dispersant is suitably in the range of from 0.05 to 10% by weight, and the amount to be added of the surfactant is suitably in the range of from 0.005 to 1% by weight based on the water in the aqueous medium respectively. An alkali or acid may be added to the aqueous medium in an amount nearly equivalent to the acid or alkali added to the cellulose organic ester solution.

The cellulose organic ester solution is added to the aqueous medium and suspended therein to form droplets followed by the evaporation of the solvent. The evaporation is suitably performed at a temperature higher than the freezing point of the aqueous medium, preferably 15° C., and less than the boiling point of the chlorinated hydrocarbon solvent. However, the temperature, at which the aforesaid evaporation is performed, may be raised above the boiling point of the solvent after the evaporation of the solvent is performed to such an extent that cellulose organic ester is solidified.

Cellulose organic ester spherical particles thus obtained are dispersed in, for example, water, alcohol, or a mixture thereof, and are saponified by adding an aqueous sodium hydroxide solution having a concentration of from 5 to 40% by weight and by stirring at a temperature of from room temperature to 50° C. to form porous, spherical particles.

In accordance with the process of the present invention, porous, spherical cellulose particles which have excellent separation property in desalting of protein can be obtained. A further feature of the present invention is in that the excluded critical molecular weight and degree of porosity of the porous, spherical cellulose particles can be varied arbitrarily as desired by varying the amount of the acid or alkali to be added. That is, in accordance with the process of the present invention, gel filtering materials having various excluded critical molecular weights applicable depending on substances to be separated therewith can also be produced.

Porous, spherical cellulose particles obtained by the process of the present invention have such effective pores large in volume and high in mechanical strength as to be usable not only in gel filtration but also as a substrate for use in an ion exchanger or affinity chromatography.

The present invention will be described more in detail by the following examples, which are not to be construed as limiting its scope. In the following examples, all parts are by weight, and the relationship of part by volume to part by weight is equal to that of 1 to kg or ml to g unless otherwise specified.

The Kav, excluded critical molecular weight, and degree of porosity of spherical cellulose particles obtained in the following examples are determined as follows:

Kav: A column having a diameter of 1.6 cm is packed with spherical cellulose particles swollen with water, which may hereinafter be referred to as gel, to a height of 50 cm, polyethylene glycol having a known molecular weight and blue dextran having a molecular weight of 2 millions are added thereto, gel filtration is carried out at a flow rate of 27 ml/hr by use of water as an eluting solution, and the elution volumes of each polyethylene glycol and blue dextran are measured by means of a differential refractometer.

Kav is determined by the following equation:

$$Kav = \frac{V_e - V_0}{V_t - V_0}$$

where $V_e$ is the elution volume (ml) for eluting polyethylene glycol, $V_0$ is the hold-up volume (ml) of the gel and determined as the elution volume (ml) for eluting blue dextran; and $V_t$ is the total bed volume (ml), and determined as the product of the cross sectional area of the column by the height of the gel bed.

Excluded critical molecular weight:

Excluded critical molecular weight is determined as the molecular weight of polyethylene glycol at a turning point of a curve obtained by plotting Kav values of the gel as an object obtained by use of various polyethylene glycols having known molecular weights respectively against respective molecular weights of the polyethylene glycols.

Degree of porosity:

A degree of porosity as a measure of porosity is determined according to the following equation:

$$\frac{\left(\begin{array}{c} V_e \text{ of polyethylene glycol having} \\ \text{a molecular weight of 62} \end{array}\right) - V_0}{V_t}$$

It can be said that the greater the degree of porosity, the higher the porosity.

EXAMPLE 1

160 parts of cellulose acetate having an acetylation degree of from 60 to 61% (marketed by Celanese Corp. under the trademark of Cellulose Triacetate KB 175) are dissolved in 2,000 parts by volume of dichloromethane, and 2 parts by volume of 36 weight % hydrochloric acid is added thereto at 15° C. to be stirred for 10 hours. Thereafter, the resulting mixture is added to an aqueous medium consisting of 2,700 parts of water, 27 parts of polyvinyl alcohol, and 2.7 parts of sodium dodecylbenzenesulfonate at 35° C. After stirring further for some period of time, nitrogen gas is passed into the gaseous phase over the liquid surface to evaporate dichloromethane.

After the completion of evaporation of the total amount of dichloromethane gas, cellulose acetate particles thus formed are filtered and washed with water. Wet particles sucked thoroughly with a suction funnel are added to 1600 parts by volume of 75 volume % water-containing methanol, suspended, stirred at 50° C. for 30 minutes, and cooled to a temperature lower than 30° C. To the resulting mixture, 398 parts of 20 weight % aqueous sodium hydroxide solution are added, and the mixture is stirred at a temperature of from 20° to 30° C. for a whole day for saponification. The resulting mixture is neutralized with acetic acid and filtered to obtain spherical cellulose particles, which are washed thoroughly with water and classified to a particle size of from 50 to 100 microns in diameter to obtain a final product.

The product thus obtained is subjected to measurement of Kav values thereof for respective molecular weights of various polyethylene glycols, and the Kav values thus obtained are plotted against respective molecular weights to obtain a curve $E_1$ as shown in FIG. 1. The curve $E_1$ shows that the excluded critical molecular weight of the product is about 2,000. The curve $E_1$ also shows a great difference between Kav values, that is elution volumes of a compound having a molecular weight greater than 2,000 and one having a molecular weight of 1,000. This shows high separation properties between two compounds as above, that is, excellent performance of desalting for separating protein from a salt of a low molecular weight.

The degree of porosity for the product was 0.47.

EXAMPLE 2

Figure 2:
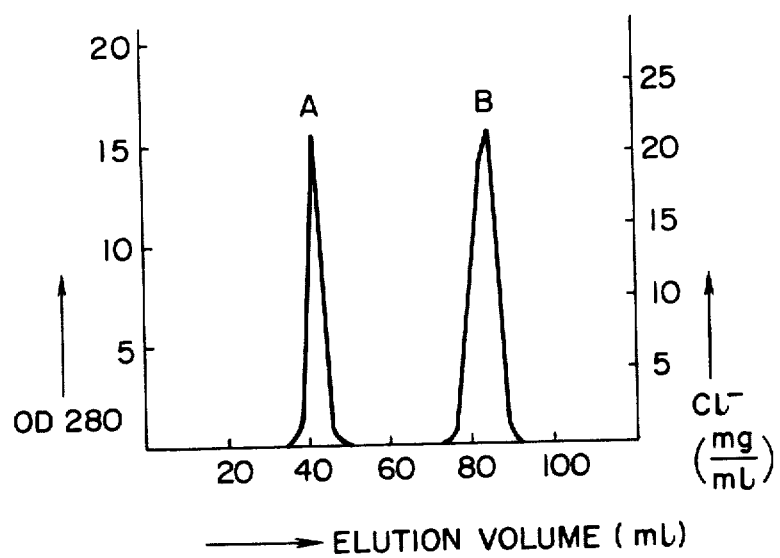
FIG. 2 is an elution pattern showing the result of an example of separating myoglobin (A) from sodium chloride (B) by use of spherical cellulose particles obtained in accordance with the process of the present invention.

Separation of myoglobin having a molecular weight of 17,000 from sodium chloride having a molecular weight of 58 by use of the product in Example 1 is carried out in the following manner to determine R, degree of separation. A column having an inner diameter of 1.5 cm is packed with a gel (the product obtained in Example 1) to a height of 49 cm. A solution prepared by dissolving 50 mg of myoglobin and 250 mg of sodium chloride in 2 ml of 0.05 M aqueous ammonium formate solution is added to the packed column for carrying out gel filtration by use of 0.05 M aqueous ammonium formate as an eluting solution at a flow rate of 28 ml/hr. The eluting solution is dispensed by every 10 ml by a fraction collector. Myoglobin is determined by ultraviolet absorption spectrum at 28 nm, and sodium chloride is determined by determination of Cl$^-$ion by means of silver nitrate titrimetric determination. Amounts of solutes for respective fractions are plotted against elution volume as shown in FIG. 2, in which A represents myoglobin, and B represents sodium chloride. From the graph in FIG. 2, R, degree of separation is determined by the following equation:

$$R = \frac{2(V_2 - V_1)}{W_1 + W_2}$$

where $V_1$ and $V_2$ are elution volume of a solute 1 (sodium chloride) and a solute 2 (myoglobin) respectively, and $W_1$ and $W_2$ are respective widthes on the base line of the peaks of the solutes 1 and 2.

The greater R is, the higher the separating property. R thus obtained is equal to 3.6.

EXAMPLE 3

Figure 3:
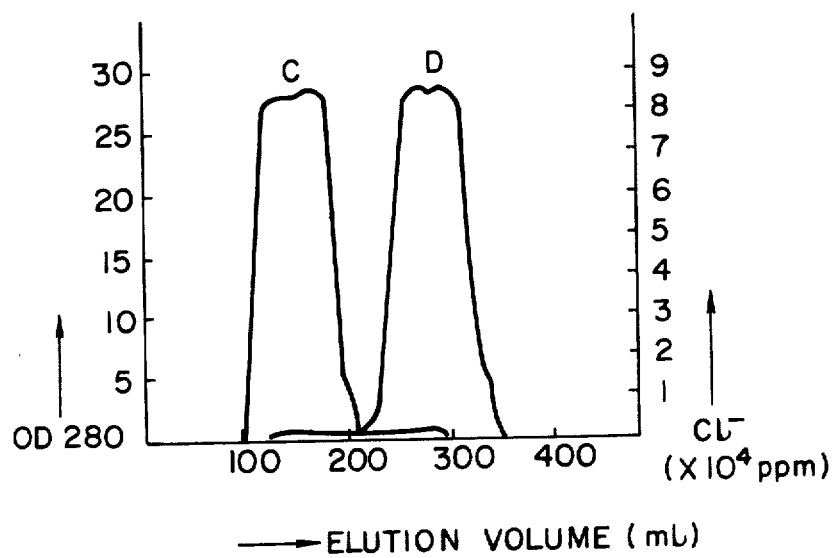
FIG. 3 is an elution pattern showing the result of an example of separating cow serum albumin (C) from sodium chloride (D) by use of spherical cellulose particles obtained in accordance with the process of the present invention.

Separation of cow serum albumin in an aqueous solution from sodium chloride by use of the product in Example 1 is carried out in the following manner. A column having an inner diameter of 2.6 cm is packed with a gel filtering material (the product obtained in Example 1) to a height of 55.5 cm. 80 ml of an aqueous solution having an albumin concentration of 5% (weight/volume) and a sodium chloride concentration of 15% are added to the packed column for carrying out gel filtration by use of water as an eluting solution at a flow rate of 95 ml/hr. The eluting solution is dispensed by every 10 ml by a fraction collector. Albumin is determined by ultraviolet absorption spectrum at 280 nm, and sodium chloride is determined by determination of Cl$^-$ion by means of silver nitrate titrimetric determination. Amounts of solutes for respective fractions are plotted against elution volume as shown in FIG. 3, in which C represents albumin, and D represents sodium chloride. Taking into considerations the graph in FIG. 3, the fractions of from 11th to 20th are collected to be 100 ml in total. The eluting solution thus collected has an albumin concentration of 3.9% and a sodium chloride concentration of 0.14%. This shows that recovery percentage for albumin is 98% and the concentration of sodium chloride is decreased from 15% to 0.14% with excellent desalting performance.

COMPARATIVE EXAMPLE

Procedures of Example 1 are repeated except that no hydrochloric acid is added to a dichloromethane solution of cellulose acetate to obtain spherical cellulose particles, properties of which are described as follows.

Relationship of Kav value with the molecular weight of polyethylene glycol is shown by a curve CE1 in FIG. 1, resulting an excluded critical molecular weight of 1000, and in a degree of porosity of 0.29.

Comparison of the above results with the results in Example 1 apparently shows that the product in Example 1 has a greater excluded critical molecular weight, a higher degree of porosity, and a higher separating property as shown by comparison of Kav at a molecular weight greater than 2,000 with that at a molecular weight of from 200 to 300 between the curves E1 and CE1 respectively.

Figure 4:
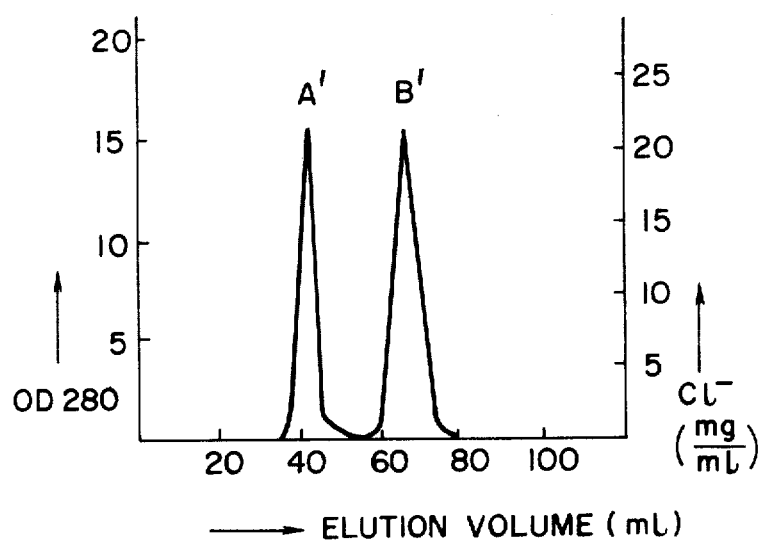
FIG. 4 is an elution pattern showing the result of an example of separating myoglobin (A') from sodium chloride (B') by use of spherical cellulose particles obtained in accordance with the process in the prior art.

The product obtained in Comparative Example 1 is subjected to separation of myoglobin from sodium chloride in the same manner as in Example 2. The result thus obtained is shown in FIG. 4, in which A' represents myoglobin, and B' represents sodium chloride, R being equal to 2.0. Comparison of the above value of R with that (3.6) of R in Example 3 shows that the product of the present invention has higher separating property.

Figure 5:
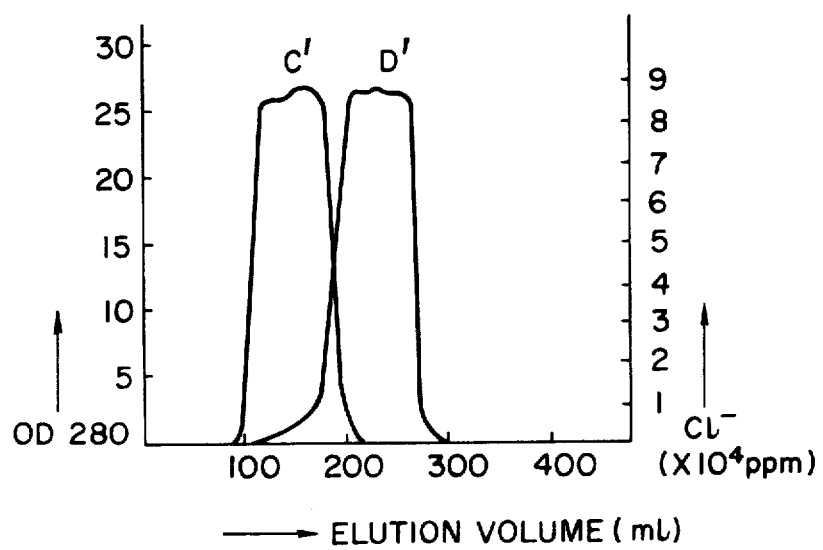
FIG. 5 is an elution pattern showing the result of an example of separating cow serum albumin (C') from sodium chloride (D') by use of spherical cellulose particles obtained in accordance with the process in the prior art.

Separately, the product obtained in Comparative Example 1 is subjected to separation of cow serum albumin from sodium chloride in the same manner as in Example 3. The result thus obtained is shown in FIG. 5, in which C' represents albumin, and D' represents sodium chloride. The graph in FIG. 5 shows a poor separation of albumin from sodium chloride. The fractions of from 11th to 20th are collected to show an albumin recovery percentage of 98% and a sodium chloride concentration of 5%. Comparison of the result thus obtained with that in Example 3 shows that the product of the present invention has much higher desalting property and separating property.

EXAMPLE 4

The excluded critical molecular weight and degree of porosity for gel particles (porous, spherical cellulose particles) prepared in the same manner as in Example 1 with varied amounts of hydrochloric acid to be added to the dichloromethane solution of cellulose acetate are shown in Table 1.

TABLE 1

| Sample No. | 1 | 2 | 3 | 4 |
|---|---|---|---|---|
| Amount of hydrochloric acid | 5 | 2.5 | 1 | 0.5 |
| Excluded critical molecular weight | 3,000 | 2,500 | 1,200 | 1,000 |
| Degree of porosity | 0.56 | 0.50 | 0.45 | 0.40 |

Table 1 apparently shows that both excluded critical molecular weight and degree of porosity can arbitrarily be varied by varying the amount to be added of hydrochloric acid.

Relationship of Kav with molecular weight for gel particles of the sample No. 1 in Table 1 is shown by a curve $E_2$ in FIG. 1. Comparison of curve $E_2$ with curve $CE_1$ apparently shows that gel particles of sample No. 1 in Example 4 have higher separating property.

EXAMPLE 5

Such properties as excluded critical molecular weight and degree of porosity of cellulose particles prepared in the same manner as in Example 1 except for the use of varied amounts of sulfuric acid are shown in Table 2.

TABLE 2

| Sample No. | 1 | 2 | 3 |
|---|---|---|---|
| Amount of sulfuric acid | 0.5 part by volume (36% by weight) | 0.5 part by volume (12% by weight) | 0.5 part by volume (4% by weight) |
| Excluded critical molecular weight | 1,500 | 1,200 | 1,000 |
| Degree of porosity | 0.40 | 0.37 | 0.33 |

Relationship of Kav with molecular weight for gel particles of the sample No. 1 in Table 2 is shown by a curve $E_3$ in FIG. 1.

Table 2 apparently shows that both excluded critical molecular weight and degree of porosity can arbitrarily be varied by varying the amount to be added of sulfuric acid, and that gel particles of the sample No. 1 in Example 5 have higher separating property as shown by comparison of curve $E_3$ with curve $CE_1$.

EXAMPLE 6

Procedures of Example 1 are repeated except that 2 parts by volume of 40 weight % aqueous sodium hydroxide solution is added to the cellulose acetate solution instead of adding hydrochloric acid to the dichloromethane solution of cellulose acetate, and stirred at 30° C. for 20 hours prior to addition thereof to the aqueous medium to obtain cellulose particles, the excluded critical molecular weight and degree of porosity of which are 2,000 and 0.38 respectively. Relationship of Kav with molecular weight is almost the same as that of curve $E_1$ in FIG. 1.

EXAMPLE 7

Procedures of Example 6 are repeated except for the use of 2 parts by volume of 20 weight % aqueous sodium hydroxide solution to obtain cellulose particles, the excluded critical molecular weight and degree of porosity of which are 1,500 and 0.36 respectively.

EXAMPLE 8

100 parts of cellulose acetate having an acetylation degree of 55% are dissolved in a mixed solvent of 700 parts by volume of dichloromethane and 300 parts by volume of acetone, and one part by volume of 35 weight % hydrochloric acid is added thereto at 35° C. to be stirred for 10 hours. Thereafter, the resulting mixture is added to an aqueous medium consisting of 3,000 parts of water and 150 parts of gelatin at 35° C. After stirring further for some period of time, nitrogen gas is passed into the gaseous phase over the liquid surface. Dichloromethane is removed at 35° C., and the temperature of the solution is raised up to 55° C. to remove acetone. Particles thus formed are filtered and washed with water. The resulting particles are sucked thoroughly with a suction funnel, added to 1,000 parts by volume of 75 volume % water-containing methanol to be suspended therein, stirred at 50° C. for 30 minutes, cooled to a temperature lower than 30° C. To the resulting mixture, 250 parts of 20 weight % aqueous sodium hydroxide solution are added, and stirred at a temperature of from 20° to 30° C. for a whole day for saponification. The resulting mixture is neutralized with acetic acid and filtered to obtain spherical cellulose particles, which are washed thoroughly with water and classified to a particle size of from 50 to 100 microns in diameter to obtain a final product. The product thus obtained has such properties that the excluded critical molecular weight is about 2,000, relationship of Kav with molecular weight is almost the same as that of curve $E_1$ in FIG. 1, and that degree of porosity is 0.47.

EXAMPLE 9

160 parts of cellulose acetate butylate having 13% of acetyl group and 37% of butyl group are dissolved in a mixed solvent of 1,400 parts by volume of dichloromethane and 600 parts by volume of methyl ethyl ketone, and 2 parts by volume of 36 weight % hydrochloric acid are added thereto at 15° C. to be stirred for 10 hours. Thereafter, the resulting mixture is added to an aqueous medium consisting of 2,700 parts of water, 27 parts of polyvinyl alcohol, and 2.7 parts of dodecylbenzenesulfonic acid at 35° C. After stirring further for some period of time, nitrogen gas is passed into the gaseous phase over the liquid surface to evaporate dichloromethane. The temperature of the solution is then raised up to 80° C. to remove methyl ethyl ketone and to obtain spherical particles of cellulose acetate butylate. Thereafter, procedures of Example 1 are repeated to obtain spherical cellulose particles. The cellulose particles thus obtained have such properties that excluded critical molecular weight is 2,000, relationship of Kav with molecular weight is almost the same as that of curve $E_1$ in FIG. 1, and that degree of porosity is 0.47.

What is claimed is:

1. A process for preparing porous, spherical cellulose particles with high reproducibility, comprising the steps of dissolving a cellulose organic ester in a solvent consisting essentially of a chlorinated hydrocarbon, adding 0.001–20 wt.% (based on said cellulose organic ester) of an acid or alkali to the dissolved cellulose organic ester solution, mixing the resultant solution at a temperature from 0° to 45° C. for a period of time of from 0.2 to 30 hours, suspending said cellulose organic ester solution in an aqueous medium to thereby form droplets, removing said solvent by evaporation to form cellulose organic ester particles, and saponifying said cellulose particles.

2. A process according to claim 1, wherein said cellulose organic ester is at least one selected from cellulose acetate, cellulose acetate butylate, cellulose butylate, cellulose propionate, and cellulose acetate propionate.

3. A process according to claim 1 wherein the concentration of said cellulose organic ester in the solution of cellulose organic ester dissolved in said solvent is in the range of from 1 to 15 parts by weight based on the 100 parts by volume of the solvent.

4. A process according to claim 1 wherein said solvent consists essentially of at least one chlorinated hydrocarbon selected from dichloromethane, trichloromethane, carbon tetrachloride, trichloroethane, tetrachloroethane, trichloroethylene and tetrachloroethylene.

5. A process according to claim 1 wherein said solvent is a mixed solvent containing chlorinated hydrocarbon as the major component and at least one material selected from methanol, ethanol, acetone and nitromethane.

6. A process according to claim 1, 2, 3, 4 or 5, wherein an acid is added.

7. A process according to claim 6, wherein said acid is an inorganic acid.

8. A process according to claim 7, wherein said acid is at least one selected from hydrochloric acid, hydrobromic acid, hydrofluoric acid, sulfuric acid, sulfurous acid, phosphoric acid, and nitric acid.

9. A process according to claim 6, wherein said acid is sulfonic acid.

10. A process according to claim 1, 2, 3, 4 or 5, wherein an alkali is added.

11. A process according to claim 10 wherein said alkali is a hydroxide of an alkali metal or an alkaline earth metal.

12. A process according to claim 1, wherein said acid or alkali is added in an amount of from 0.01 to 15% by weight based on said cellulose organic ester.

13. A process according to claim 12, wherein said acid or alkali is added in an amount of from 0.05 to 10% by weight based on said cellulose organic ester.

14. A process according to claim 1 wherein said acid or alkali is added and mixed with the solvent before the cellulose organic ester is dissolved in said chlorinated hydrocarbon solvent.

15. A process for preparing porous, spherical cellulose particles with high reproducibility, comprising the steps of dissolving a cellulose organic ester in a solvent consisting essentially of a chlorinated hydrocarbon, mixing the resultant solution at a temperature from 0° to 45° C. for a period of time of from 0.2 to 30 hours, suspending said cellulose organic ester solution in an aqueous medium to thereby form droplets, removing said solvent by evaporation to form cellulose organic ester particles, and saponifying said cellulose particles, 0.001 to 20 wt% (based on said cellulose organic ester) of an acid or alkali being added to said solvent while the cellulose organic ester is being dissolved or prior to said dissolution.

* * * * *